April 27, 1971　　　　D. W. GEHRES　　　　3,576,608
HYDROTHERMAL SYNTHESIS OF QUARTZ UTILIZING X-CUT SEED
PLATE ELONGATED ON THE CRYSTALLOGRAPHIC Z AXIS
Filed Oct. 16, 1967

INVENTOR
DAVID W. GEHRES

BY Synhue, Rothwell, Mion, Zinn & Macpeak
ATTORNEYS

United States Patent Office 3,576,608
Patented Apr. 27, 1971

3,576,608
HYDROTHERMAL SYNTHESIS OF QUARTZ UTILIZING X-CUT SEED PLATE ELONGATED ON THE CRYSTALLOGRAPHIC Z AXIS
David W. Gehres, Carlisle, Pa., assignor to Aiken Industries, Inc., c/o P. R. Hoffman Company, Division of Aiken Industries, Inc., Carlisle, Pa.
Filed Oct. 16, 1967, Ser. No. 675,403
Int. Cl. B01d 9/02; C01b 33/12
U.S. Cl. 23—301                                          7 Claims

ABSTRACT OF THE DISCLOSURE

A quartz rock is grown by a hydrothermal synthesis process on a seed plate over 2 inches long on the crystallographic Z axis with its width on the Y axis and its thickness on the X axis. The seeds are mounted in pairs in an autoclave with the $-X$ faces of the seed plates abutting during the growth cycle. Elongated bar-shaped blanks having their length in the Z axis equal to or greater than the length of the seed are sliced from the grown seed by cutting parallel to the Z axis.

BACKGROUND

Field of the invention

This invention relates to improvements in growing quartz crystals by hydrothermal synthesis on a unique seed, and to producing useful blanks from the grown quartz rock.

Prior art

Hydrothermal synthesis of quartz is an old well known process which has been commercially refined to the point that a substantial volume of quartz now used in frequency control applications is obtained from synthetic or cultured quartz. In the known process, an autoclave holds a supply of nutrient material in a lower portion thereof, the autoclave is filled to a preselected volume with an aqueous solution including sodium ions and quartz seeds are held in the upper portion of the autoclave. The autoclave is heated to provide high temperature and pressure conducive to the growing of quartz on the seeds.

It has been known in the art that any cut and orientation of seed could be used in the process. However, the most commonly known seeds which have been used included minor $r$ seeds major R seeds, and Z-cut seeds. The major R seeds are seeds of plate shape usually having an orientation parallel to the major rhombohedral face of quartz, and the minor $r$ seeds similarly have an orientation parallel to the minor rhombohedral face of quartz. Z-cut seeds are cut perpendicular to the crystallographic Z axis, and they may be in the form of thin plates. In addition, these seeds may be sliced thinly parallel to the crystallographic Y axis in order to produce seeds which are substantially square in cross-section and elongated in the crystallographic Y axis which are known as Y bars. Quartz grows at different rates according to process conditions in diffeernt crystallographic directions producing a synthetic rock grown on the seed which has a size depending upon the length of the growth cycle and the size and orientation of the seed. In commercially used hydrothermal quartz synthesis processes, the growth in the crystallographic Z direction is the greatest, but there is also a significant growth in the crystallographic $+X$ direction, some substantially lesser degree of growth in the crystallographic $-X$ axis direction, ad very little growth in the crystallographic Y axis direction.

The so-called "Y bar" seed and "Y plate" seeds which are most commonly used in the present-day hydrothermal processes produce rocks which are then cut into blanks. They cannot, however, be useful in growing quartz rocks suitable for cutting into blanks having a substantial length in the crystallographic Z axis direction. In order to use the known commercially avialable seeds or the known seeds, such as the Y bar or Y plate seeds, to produce a blank which is elongated on the Z axis would require an extremely long seed and most important, a growing time measured in years.

Recent technological advances, especially in advanced frequency control applications, have required the use of a blank elongated in the crystallographic Z direction over 2 inches, and no known process can produce this blank from synthetic quartz.

SUMMARY OF THE INVENTION

This invention provides a method of producing a bar-shaped blank of quartz having a length on the crystallographic Z axis of over 2 inches by a hydrothermal process utilizing a rectangular seed plate having its length on the crystallographic Z axis at least equal to the length of the bar-shaped blank, its width on the crystallographic Y axis and its thickness on the crystallographic X axis. A rock grown by hydrothermal synthesis from this seed is then sliced parallel to the crystallographic Z axis to produce the desired shaped blanks. This allows the blank to be obtained from a crystal which can be grown in a reasonable number of days utilizing presently available autoclaves and process parameters. For economic utilization of autoclave space $-X$ growth is suppressed by mounting the seeds in pairs with their $-X$ faces abutting during the growth cycle.

DESCRIPTION OF THE PREFERRED EMBODIMENTS

Figure 1:
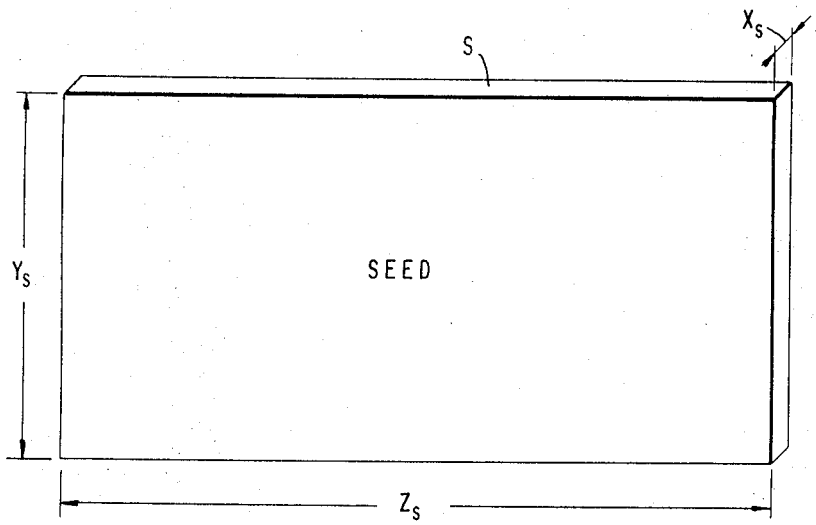
FIG. 1 is a perspective view of the seed utilized in the method of this invention.
Figure 2:
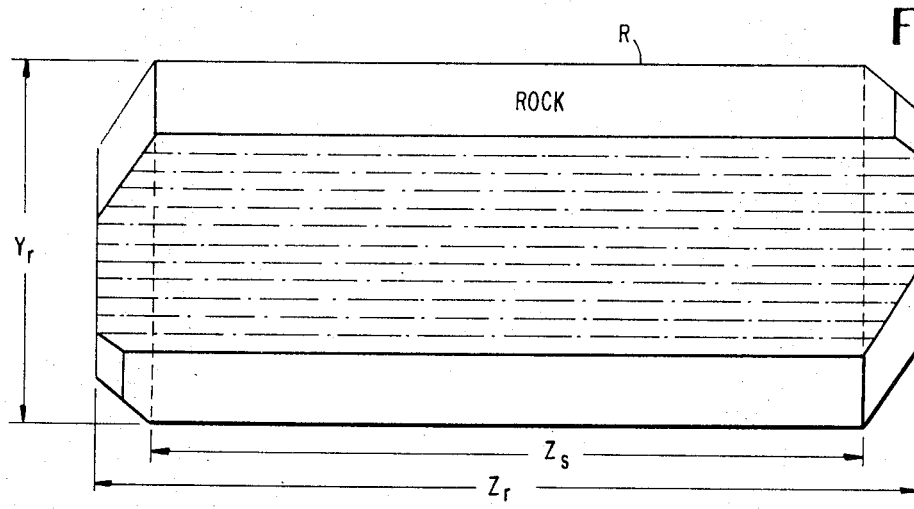
FIG. 2 is a top plan view of a rock grown by the method of this invention utilizing the seed of FIG. 1.
Figure 3:
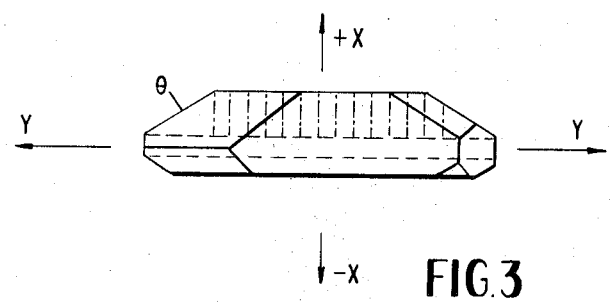
FIG. 3 is an end elevation view of the rock grown in FIG. 2 and shows how blanks of desired shape are cut from the rock.

FIG. 1 shows the seed to be utilized in the process of this invention. Note that the seed body is a rectangular piece of quartz, either natural or synthetic, which has its length in the crystallographic Z axis of more than 2 inches. Its width in the crystallographic $Y_s$ axis is sufficient to allow for a number of blanks to be cut from the seed even with the habit of growth at an angle to the Y axis. The thickness $X_s$ is any convenient dimension, but preferably the seed would be comparatively thin, that is, around .080 inch. A seed, such as shown in FIG. 1, or preferably a number of such seeds, are mounted in the upper portion of an autoclave and the autoclave is operated in accordance to known process parameters for a number of days in order for quartz to deposit on the seed and to grow into a rock R, as shown in FIGS. 2 and 3. As shown in FIG. 2, the rock will increase in length beyond the length of the seed due to the relatively rapid growth in the crystallographic Z axis to provide a dimension $Z_R$. In addition, the width of the rock will be about the same as the seed due to the lack of any significant growth in the crystallographic Y direction. As shown in FIG. 3, the growth is several times faster in the $+X$ direction than in the $-X$ direction, producing a rock which grew faster on one side of the X-cut seed plate than on the other side.

Figure 4:
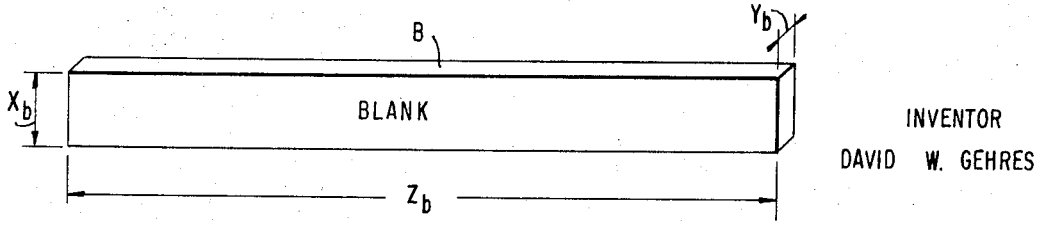
FIG. 4 is a perspective view of a blank which is sliced from the rock of FIGS. 2 and 3.

After the rock shown in FIGS. 2 and 3 has grown to the desired size as established by the length of the growth cycle, it is removed from the autoclave in a known manner and processed into the desired blanks. FIG. 4 shows a blank which is especially useful in highly advanced frequency control applications. The length of the blank is long in the crystallographic Z dimension, $Z_b$ has its width in the X direction, $X_b$ and its thickness in the Y direction, $Y_b$. As can be seen from the phantom lines shown in FIGS. 2 and 3, these blanks are obtained by slicing the grown rock parallel to the crystallographic Z axis to a thickness equal to the desired thickness of the blank, $Y_b$.

It is economically desirable to also slice the rock and save the seed so that the seed can be reused. Thus, the amount of growth in the +X direction determines the height or X dimension of the blank, $X_b$.

Figure 5:
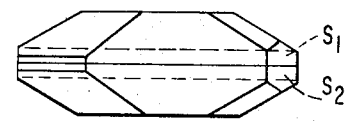
FIG. 5 is an end elevation view similar to FIG. 3 showing the growing of two rocks on two seed plates positioned face-to-face with the $-X$ faces abutting one another in an autoclave.

For economical use of space within the autoclave, two seeds S1 and S2, shown in FIG. 5, are mounted face-to-face with their —X faces abutting so as to inhibit growth in the —X direction, since the —X growth is not as fast as the +X growth. The growth will then be all on the +X face of the seed to produce two rocks of a nature shown in FIG. 5, both of which can be sliced down to the seed or through the seed to produce the blank.

The dimension of the seeds will be such that the length in the crystallographic Z axis will be greater than 2 inches and will be at least as long as the length of the blank desired. The dimension of the seed in the crystallographic Y axis will be at least 3.464 times the dimension of the blank in the crystallographic X direction, $X_b$ plus the width of one blank $Y_b$. The reason the seed has to be this wide in the crystallographic Y direction is to allow for the 60° angle $\theta$ which forms due to the habit of the quartz growth. The thickness of the seed in the crystallographic X direction can be any convenient dimension.

The seed need not extend exactly along the crystallographic X, Y and Z axes. It is within the scope of the invention to have variations from the Z axis from 0° to plus or minus 90° around the X axis. Variations in the direction of the X axis may be from 0° to plus or minus 10° around the Y axis, and variations in the direction of the width of the seed may vary along the crystallographic Y direction from 0° to plus or minus 30° around the Z axis.

With the use of this seed body, economical production of blanks which are over 2 inches in the crystallographic Z direction may be accomplished, and the mounting of the seeds in pairs with their —X axis facing allows a twofold increase in production, utilizing the same autoclave space. In addition, the rock produced provides a source of large X-cut crystal blanks heretofore unavailable from cultured or synthetic quartz.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a method of hydrothermal synthesis of quartz of the type including, positioning a supply of nutrient material in a lower portion of a vertical autoclave, filling over half of the volume of the autoclave with an aqueous solution including sodium ions, holding a seed of quartz in the upper portion of the autoclave, and heating the autoclave to provide high temperature and pressure therein conducive to growing of quartz on the seed, the improvements comprising; utilizing a rectangular seed plate having its length substantially on the crystallographic Z axis the seed plate being over 2 inches in length, the seed plate having its width substantially on the crystallographic Y axis, the seed plate having its thickness substantially on the crystallographic X axis.

2. A method as defined in claim 1 wherein there are a plurality of pairs of seeds, and further comprising mounting the seeds of each pair face-to-face with the —X faces abutting to suppress —X growth.

3. A method as defined in claim 1 wherein the seed plate extends along the crystallographic X, Y and Z axes with no variations.

4. A method of producing a bar-shaped blank of quartz having its length on the crystallographic Z axis of over 2 inches comprising; growing a quartz rock by hydrothermal synthesis upon a rectangular seed plate having its length substantially along the crystallographic Z axis and of at least 2 inches and at least equal to the length of the bar-shaped blank, the seed having its width substantially along the crystallographic Y axis equal to at least the dimension of the bar-shaped blank on the Y axis plus 3.46 times the height of the bar on the X axis, and the seed having its thickness on the crystallographic axis, and slicing the grown quartz rock into lengthwise slabs to produce the desired sized bar-shaped blanks by cutting slices from the rock parallel to the crystallographic Z axis.

5. A method as defined in claim 4 further comprising slicing the rock on planes parallel to the plane of the seed plate to recover the seed plate prior to slicing the slab lengthwise to produce the desired shaped blanks.

6. A method as defined in claim 4 wherein the growing is accomplished on at least a pair of seed plates positioned face-to-face during the hydrothermal synthesis with the —X faces of the plates abutting to suppress —X growth.

7. A method as defined in claim 4 wherein the seed plate extends along the crystallographic X, Y and Z axes with no variations.

References Cited

UNITED STATES PATENTS

| 2,674,520 | 4/1954 | Sobek | 23—301 |
| 2,914,389 | 11/1959 | Charbonnet | 23—301 |
| 2,923,606 | 2/1960 | Hale et al. | 23—301 |
| 3,291,575 | 12/1966 | Sawyer | 23—301 |

WILBUR L. BASCOMB, JR., Primary Examiner

R. T. FOSTER, Assistant Examiner

U.S. Cl. X.R.

23—182